United States Patent [19]

Hall-Jackson

[11] 3,849,219
[45] Nov. 19, 1974

[54] MANUFACTURE OF OPTICAL APPARATUS
[75] Inventor: John Alan Hall-Jackson, Acomb, England
[73] Assignee: The Rank Organisation Limited, London, England
[22] Filed: June 21, 1973
[21] Appl. No.: 371,957

[30] Foreign Application Priority Data
June 21, 1972  Great Britain.................... 29081/72

[52] U.S. Cl.............. 156/73.6, 65/DIG. 7, 156/73, 156/180, 156/267, 156/294, 156/296, 161/7, 240/10 L
[51] Int. Cl...................... B32b 17/04, B32b 31/16
[58] Field of Search............ 156/73, 180, 293, 294, 156/296, 267; 240/10 P, 10 L; 161/7; 350/96 B; 65/DIG. 7

[56] References Cited
UNITED STATES PATENTS
| 2,311,704 | 2/1943 | Simison............................. 156/296 |
| 3,674,581 | 7/1972 | Kalnin et al. ...................... 156/180 |
| 3,717,531 | 2/1973 | Smith................................. 156/296 |
| 3,758,285 | 9/1973 | Knowlton........................... 240/10 |

Primary Examiner—Daniel J. Fritsch
Attorney, Agent, or Firm—Brisebois & Kruger

[57] ABSTRACT

A fibre optic spray giving an improved display when incorporated in a display device, together with a method and apparatus for producing said spray according to which a bundle is formed which comprises a large number of optical fibres of substantially equal length each extending from end to end of the bundle, one end of the bundle is located in a holding ferrule which is inserted into the open end portion of a hollow forming ferrule also having a portion tapering internally either continuously or in a series of steps from a maximum dimension adjacent the end portion receiving the bundle to a minimum dimension at the other end, the ferrule assembly is supported with the holding ferrule above the forming ferrule, the assembly is shaken or vibrated to cause the inner fibres of the bundle to fall into the lower tapering portion of the forming ferrule to a staggered extent corresponding to the internal taper, and the fibres are bonded in position in the holding ferrule, the forming ferrule being withdrawn and the staggered fibre lengths exposed from within it being cut off.

7 Claims, 7 Drawing Figures

MANUFACTURE OF OPTICAL APPARATUS

BACKGROUND OF THE INVENTION

This invention relates generally to the manufacture of optical apparatus and more particularly to a fibre optic spray, a method of producing such a spray, and apparatus for use in this method.

Fibre optic sprays, sometimes known as fibre optic mares' tails, are employed in display devices. A fibre optic spray consists of a bundle of optical fibres bonded together at one end and supported with this bonded end lowermost so that the free fibre lengths above the bonded end droop over into a spray. The lower end of the bundle receives light from a suitable source, usually through a rotating multi-colour filter, so that the drooping ends of the fibres emit a continually changing pattern of light of different colours.

A disadvantage of known fibre optic sprays is that the number of fibre ends per unit area of the surface of the spray is not at all uniform. The majority of the fibres droop to the maximum possible extent, so that there is a dearth of fibre ends in the centre of the spray. This spoils the visual effect of the operating display device.

An object of the invention is to overcome or reduce this disadvantage.

BRIEF SUMMARY OF THE INVENTION

In one aspect, the invention provides a fibre optic spray comprising a fibre bundle consisting of a large number of optical fibres having level ends at one end of the bundle, whereat the fibres are bonded together to provide a flat end face on the bundle which is ground and polished, the fibres being free to fall into a spray at the other end of the bundle and the spray-forming lengths of the fibres being regularly graduated either continuously or in steps from a minimum at the centre of the bundle to a maximum at the periphery.

With this arrangement, because the central fibres of the bundle are shorter in length, they droop to a reduced extent, and so tend to fill the central region of the surface of the spray. By graduating the fibre lengths appropriately, a substantially uniform distribution of fibre ends can be achieved over the entire surface of the spray.

In another aspect, the invention provides a method of producing a fibre optic spray according to which a bundle is formed which comprises a large number of optical fibres of substantially equal length each extending from end to end of the bundle, one end of the bundle is located in a holding ferrule which is inserted into the open end portion of a hollow forming ferrule also having a portion tapering internally either continuously or in a series of steps from a maximum dimension adjacent the end portion receiving the bundle to a minimum dimension at the other end, the ferrule assembly is supported with the holding ferrule above the forming ferrule, the assembly is shaken or vibrated to cause the inner fibres of the bundle to fall into the lower tapering portion of the forming ferrule to a staggered extent corresponding to the internal taper, and the fibres are bonded in position in the holding ferrule, the forming ferrule being withdrawn and the staggered fibre lengths exposed from within it being cut off.

While the tapering portion of the forming ferrule may be of steep conical form, for better uniformity of staggering of the fibre lengths between successive intermediate zones of the bundle between the centre and the periphery, the forming ferrule is preferably provided with a series of internal ledges to form the internal tapering portion. The desired pattern of staggering is also more readily achieved if the ferrule assembly is supported vertically while being vibrated.

Preferably, the staggered fibre lengths are cut off before bonding the fibres in position. The fibres may be bonded in position by the injection of an epoxy resin and subsequent curing.

Usually the cut-off end of the bonded fibre bundle is ground and polished.

For most purposes a spray having a substantially hemi-spherical surface is required. Usually, therefore, the forming ferrule and the holding ferrule are of circular cross-section to handle a cylindrical fibre optic bundle.

In a further aspect, the invention provides apparatus for use in producing a fibre optic spray comprising a hollow holding ferrule comprising a uniformly-sectioned portion open at both ends, and a hollow forming ferrule having an open end portion dimensioned to receive the holding ferrule and also having a portion tapering internally either continuously or in a series of steps from a maximum dimension, equal to the internal dimension of the holding ferrule, adjacent the end portion for receiving the holding ferrule to a minimum dimension at the other end.

Depending on the stiffness and other physical characteristics of the fibres, the tapering portion of the forming ferrule preferably has a mean taper angle of between 5° and 20°. The term "mean taper angle" is employed because, as indicated above, the tapering portion of the forming ferrule may be formed by a series of internal ledges, so that, in the case of a circularly sectioned forming ferrule, the tapering portion may consist of a series of short cylinders of reducing internal diameter.

DESCRIPTION OF EMBODIMENTS

A preferred practical method and apparatus for producing a fibre optic spray in accordance with the invention will now be described with reference to the accompanying drawings, wherein.

Figure 1:
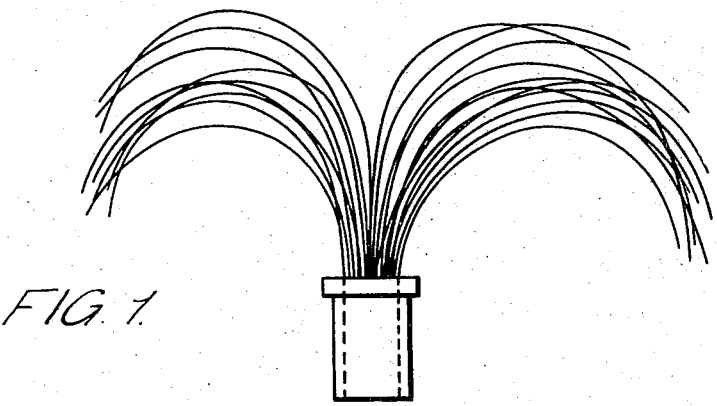
FIG. 1 shows a known fibre optic spray.
Figure 2:
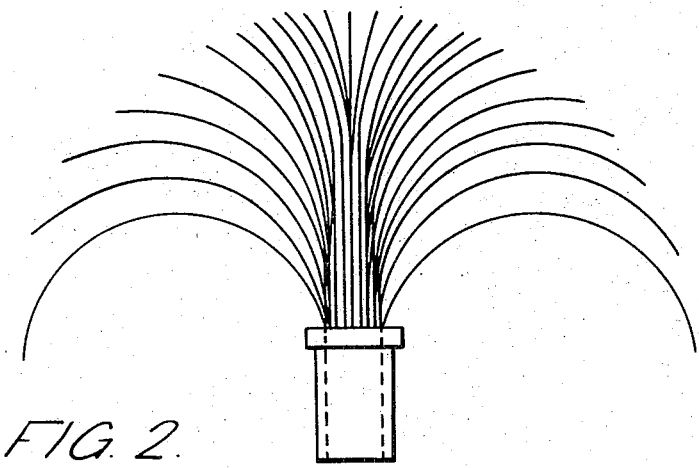
FIG. 2 shows a fibre optic spray in accordance with the invention.
Figure 3:
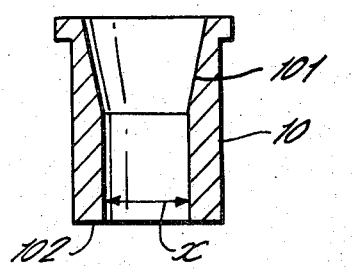
FIG. 3 shows a holding ferrule for use in a preferred method of producing the fibre optic spray of FIG. 2.
Figure 4:
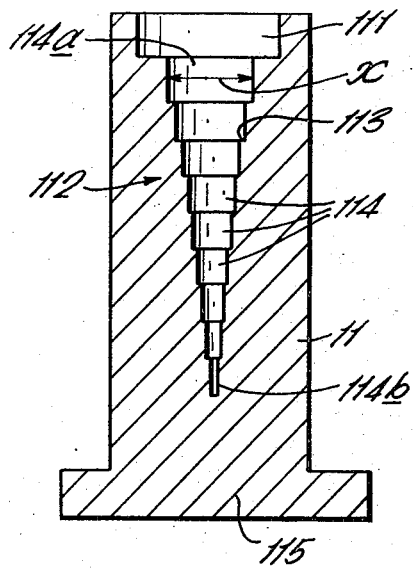
FIG. 4 shows a forming ferrule for use in the preferred method.

The known fibre optic spray shown in FIG. 1 has the disadvantage that there is a shortage of free fibre ends at the centre of the spray above the base. The fibre optic spray in accordance with the invention and which is shown in FIG. 2 overcomes this disadvantage and has a substantially uniform distribution of fibre ends over a hemi-spherical surface. The production of the spray of FIG. 2 is illustrated by FIGS. 3 to 7.

The apparatus consists of a holding ferrule 10 (FIG. 3), a forming ferrule 11 (FIG. 4) and a vibrating table (not shown).

The holding ferrule 10 consists of a cylindrical sleeve having an internally tapered entry portion 101 at one end.

The forming ferrule 11 includes a cylindrical entry portion 111 dimensioned to receive the end 102 of the holding ferrule 10 opposite to its internally tapered entry portion. Beyond the entry portion, the forming ferrule has a tapered portion 112 formed by a series of annular ledges 113 defining successive cylindrical spaces 114 of reducing internal diameter. The cylindrical space 114a of maximum internal dimension adjoins the entry portion of the ferrule, and its internal diameter $x$ is equal to the internal diameter $x$ of the end 102 of the holding ferrule 10 which is received in the forming ferrule 11. The smallest internal cylindrical space 114b is closed by the base 115 of the forming ferrule 11 remote from its entry portion.

By way of example, to give an approximate indication of the relative dimensions involved, the tapering portion 112 of the forming ferrule 11 may have a length equal to about four times the internal diameter $x$ of the largest cylindrical space 114a, which is equal to the internal diameter $x$ of the holding ferrule 10. There may be eight annular ledges 113 substantially uniformly spaced along the length of the tapering portion 112. More generally, the mean angle of taper may be between 5° and 20°.

The vibrating table is of a conventional kind, capable of adjustment in respect of the frequency and amplitude of vibration.

Figure 5:
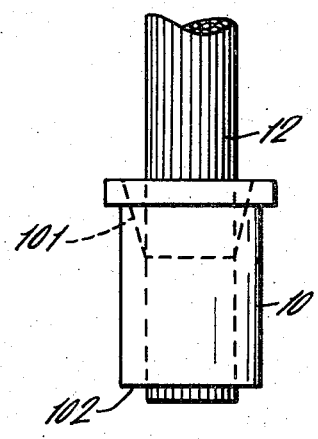
FIG. 5 shows a fibre bundle supported by the holding ferrule.

To produce a fibre optical spray, the holding ferrule 10 is used as shown in FIG. 5 to support by frictional gripping thereof a cylindrical fibre optic bundle 12 made up of a large number of fibres of equal lengths each extending from end to end of the bundle. One end of the bundle 12 is inserted into the holding ferrule 10 through the tapered entry portion 101 so that the inner end of the bundle projects slightly beyond the other end 102 of the ferrule.

The holding ferrule 10 is then inserted into the entry portion 111 of the forming ferrule 11. The base of the forming ferrule 115 permits the assembly to be stood vertically on the vibrating table.

Figure 6:
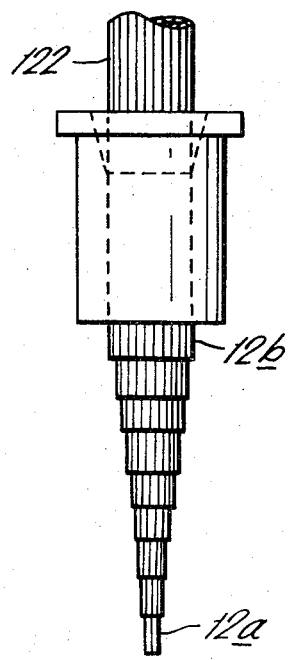
FIG. 6 shows the staggered fibres in the bundle after vibration thereof and subsequent withdrawal of the forming ferrule.

The vibrating table is operated for a sufficient period, usually a few seconds, to cause the fibres in the bundle 12 to fall under gravity to fill the forming ferrule. The central fibres 12a fall to the greatest extent, the peripheral fibres 12b to the minimum extent, as revealed when the forming ferrule 11 is withdrawn, as shown in FIG. 6. More generally, the fibres fall to a staggered extent corresponding to the internal taper of the forming ferrule.

Figure 7:
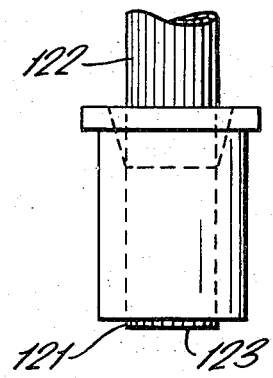
FIG. 7 shows the base of the finished spray.

When the forming ferrule 11 has been withdrawn, a thin, circular, diamond saw is used to cut off the staggered fibre lengths exposed from within it, leaving a very short projection of the bundle 121 below the holding ferrule 10 (see FIG. 7). An epoxy resin is then injected into the fibres inside the holding ferrule 10. The resin is cured to form a bonded base from which the spray-forming lengths 122 of the fibres freely project. The cut end 123 of the bonded base is ground and polished to improve efficiency of the spray when incorporated in a display device with a suitable source of light.

The final product is the fibre optic spray shown in FIG. 2 in which the spray-forming lengths of the fibres are regularly graduated in steps from a minimum at the centre of the bundle to a maximum at the periphery. In a practical embodiment for use in a display device, the diameter of the fibre bundle at the ground and polished end of the bonded base lies between 10 mm. and 30 mm. The fibres, usually of individual diameter in the range of 0.04 mm. to 0.18 mm., have lengths regularly graded from about 18 cm. to 39 cm.

It will be appreciated that various modifications of the above described method and apparatus are possible within the scope of the invention. For example, under some circumstances a conical forming ferrule may be employed in place of the stepped taper which is usually preferred.

I claim:

1. A method of producing a fibre optic spray comprising the steps of:
    forming a bundle which comprises a large number of optical fibres of substantially equal length each extending from end to end of the bundle;
    locating one end of the bundle in a holding ferrule;

inserting the holding ferrule into the open end portion of a hollow forming ferrule also having a portion of internal diameter reducing from a maximum dimension adjacent the end portion receiving the bundle to a minimum dimension at the other end;

supporting the ferrule assembly with the holding ferrule above the forming ferrule;
    shaking the assembly to cause the inner fibres of the bundle to fall to a staggered extent into the lower reducing-diameter portion of the forming ferrule;

bonding the fallen fibres in position to the holding ferrule, the forming ferrule being withdrawn; and cutting off the staggered fibre lengths exposed by withdrawal of the forming ferrule.

2. A method according to claim 1, wherein the hollow forming ferrule is provided with a series of internal ledges to form the internal tapering portion.

3. A method according to claim 1, wherein the ferrule assembly is supported vertically while being vibrated.

4. A method according to claim 1, wherein the staggered fibre lengths are cut off before bonding the fibres in position.

5. A method according to claim 1, wherein the cut-off end of the bonded fibre bundle is ground and polished.

6. A method according to claim 1, wherein the fibres are bonded in position by the injection of an epoxy resin and subsequent curing.

7. A method according to claim 1, wherein the forming ferrule and the holding ferrule are of circular cross-section to handle a cylindrical fibre optic bundle.

* * * * *